US010499075B2

United States Patent
Jaeger et al.

(10) Patent No.: US 10,499,075 B2
(45) Date of Patent: Dec. 3, 2019

(54) METHOD FOR CODING A DEPTH LOOKUP TABLE

(71) Applicant: Huawei Technologies Co., Ltd., Shenzhen (CN)

(72) Inventors: Fabian Jaeger, Aachen (DE); Mathias Wien, Aachen (DE); Jacek Konieczny, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 769 days.

(21) Appl. No.: 14/852,190

(22) Filed: Sep. 11, 2015

(65) Prior Publication Data
US 2016/0029036 A1 Jan. 28, 2016

Related U.S. Application Data

(63) Continuation of application No. PCT/EP2013/055178, filed on Mar. 13, 2013.

(51) Int. Cl.
*H04N 19/463* (2014.01)
*H04N 19/597* (2014.01)
(Continued)

(52) U.S. Cl.
CPC ......... *H04N 19/463* (2014.11); *H04N 19/176* (2014.11); *H04N 19/25* (2014.11);
(Continued)

(58) Field of Classification Search
None
See application file for complete search history.

(56) References Cited

U.S. PATENT DOCUMENTS

| 2009/0110073 | A1* | 4/2009 | Wu ................... H04N 19/30 375/240.15 |
| 2010/0202540 | A1* | 8/2010 | Fang ............ H04N 21/234327 375/240.16 |
| 2015/0201178 | A1* | 7/2015 | Lakshminarayanan ................ H04N 19/597 348/43 |

FOREIGN PATENT DOCUMENTS

| CN | 101415120 A | 4/2009 |
| EP | 1513349 A2 | 3/2005 |

(Continued)

OTHER PUBLICATIONS

"Series H: Audiovisual and Multimedia Systems, Infrastructure of Audiovisual Services—Coding of Moving Video, Advanced Video Coding for Generic Audiovisual Services," Telecommunications Standardization Sector of ITU, ITU-T, H.264, Jan. 2012, 680 pages.
(Continued)

*Primary Examiner* — Christopher G Findley
(74) *Attorney, Agent, or Firm* — Slater Matsil, LLP

(57) ABSTRACT

The invention relates to a method (100) for coding a depth lookup table, DLT, (201, 211), the depth lookup table comprising depth value information of at least a part of a 3D picture, the method (100) comprising: selecting (101) a reference depth lookup table (203, 213); determining (103) a difference depth lookup table (205, 215) based on a comparison between depth value information of the depth lookup table to be coded (201, 211) and depth value information of the reference depth lookup table (203, 213); and coding (105) depth value information of the difference depth lookup table (205, 215) according to a predetermined coding rule.

22 Claims, 9 Drawing Sheets

(51) Int. Cl.
*H04N 19/50* (2014.01)
*H04N 19/65* (2014.01)
*H04N 19/176* (2014.01)
*H04N 19/25* (2014.01)

(52) U.S. Cl.
CPC ........... *H04N 19/50* (2014.11); *H04N 19/597* (2014.11); *H04N 19/65* (2014.11)

(56) References Cited

FOREIGN PATENT DOCUMENTS

| | | | |
|---|---|---|---|
| EP | 2051527 | A1 | 4/2009 |
| EP | 2051529 | A1 | 4/2009 |
| JP | 2009100473 | A | 5/2009 |
| JP | 2011166816 | A | 8/2011 |
| KR | 20090038374 | A | 4/2009 |
| WO | 2005027497 | A2 | 3/2005 |

OTHER PUBLICATIONS

Jäger, F., "3D-CE6.h: Simplified Depth Coding with an Optional Depth Lookup Table," Joint Collaborative Team on 3D Video Coding Extension Development of ITU-T SG 16 WP 3 and ISO/IEC JTC 1/SC 29/WG 11, Document: JCT3V-B0036, 2nd Meeting: Shanghai, CN, Oct. 13-19, 2012, 16 pages.

Tech, G., "3D-HEVC Test Model 2," Joint Collaborative Team on 3D Video Coding Extension Development of ITU-T SG 16 WP 3 and ISO/IEC JTC 1/SC 29/WG 11, Document: JCT3V-B1005_d0, 2nd Meeting: Shanghai, CN , Oct. 13-19, 2012, 118 pages.

Lim, I. et al., "3D-CE6 Related: Improved Depth Lookup Table(Slice-layer Signalling)," Joint Collaborative Team on 3D Video Coding Extension Development of ITU-T SG 16 WP 3 and ISO/IEC JTC 1/SC 29/WG 11, Document: JCT3V-C0093, 3rd Meeting: Geneva, CH, Jan. 17-23, 2013, 12 pages.

Zhang, K. et al., "3D-CE6.h related: An efficient coding method for DLT in 3DVC," Joint Collaborative Team on 3D Video Coding Extension Development of ITU-T SG 16 WP 3 and ISO/IEC JTC 1/SC 29/WG 11, Document: JCT3V-C0142, 3rd Meeting: Geneva, CH, 17-23, Jan. 2013, 5 pages.

Merkle, P., "Description of Core Experiment 6 (CE6) on Depth Intra Coding,"Joint Collaborative Team on 3D Video Coding Extension Development of ITU-T SG 16 WP 3 and ISO/IEC JTC 1/SC 29/WG 11, 3rd Meeting: Geneva, CH, 17-23, Document: JCT3V-C1106, Jan. 2013, 4 pages.

Jäger, F., "CE6.H related: Results on Updating Mechanism for Coding of Depth Lookup Table (Delta-DLT)," Joint Collaborative Team on 3D Video Coding Extensions of ITU-T SG 16 WP 3 and ISO/IEC JTC 1/SC 29/WG 11, 4th Meeting: Incheon, KR, Document: JCT3V-D0054, Apr. 20-26, 2013, Document: JCT3V-D0054, 13 pages.

* cited by examiner

METHOD FOR CODING A DEPTH LOOKUP TABLE

This application is a continuation of International Application No. PCT/EP2013/055178, filed on Mar. 13, 2013, which is hereby incorporated by reference in its entirety.

TECHNICAL FIELD

The present invention relates to a method and apparatus for coding a depth lookup table (DLT) and a method and apparatus for decoding a depth lookup table, especially in the field of computer vision, in particular in 3D video processing and 3D video coding.

BACKGROUND

In 3D video, depth data is usually represented as set of depth maps that correspond to each frame of the texture video. Intensity of each point of the depth map describes the distance from the camera of the visual scene represented by this point. Alternatively, a disparity map may be used, which values are inversely proportional to the ones of the depth map and can be used to derive the depth maps.

In 3D video coding, a depth map for each view needs to be encoded besides the conventional video data. These depth maps show different signal characteristics compared to video data as they contain piecewise smooth regions bounded by strong edges. As depth maps are often estimated from texture data or are pre-processed, their histogram might be relatively sparse. As a result, a Depth Lookup Table (DLT) was proposed [F. Jäger, "3D-CE6.h Results on Simplified Depth Coding with an optional Depth Lookup Table," Joint Collaborative Team on 3D Video Coding Extension Development (JCT-3V) of ITU-T VCEG and ISO/IEC MPEG, Shanghai, China, JCT3V-B0036, 2012] to exploit the histogram characteristics by only signaling difference indexes of the DLT instead of signaling the residual depth values themselves. By this approach the bit depth of these residual values can be reduced, which consequently results in higher coding efficiency.

The DLT is constructed at the encoder by analyzing the histogram of the original, uncompressed depth map. This DLT is afterwards transmitted to the decoder to allow for the mapping of indexes to actual depth values. Histogram values of the depth maps may vary over time and therefore there is a requirement for an update mechanism. Moreover, in a multi-view coding scenario, multiple depth maps may have different depth map histograms and in these cases such an update mechanism is also beneficial to the overall coding performance.

In the latest specification of the 3D extension for High Efficiency Video Coding [G. Tech, K. Wegner, Y. Chen, S. Yea, "3D-HEVC test model 2," Document of Joint Collaborative Team on 3D Video Coding Extension Development, JCT3V-B1005, October, 2012], the DLT is only sent once per sequence in Sequence Parameter Set (SPS), separately for all views. This approach keeps the overhead for the DLT signaling relatively low.

It was also proposed to signal the DLT in the slice header of each I-Slice of the base view [I. Lim, H. C. Wey, and D. S. Park, "3D-CE6.h Related: Improved depth lookup table (DLT)," Joint Collaborative Team on 3D Video Coding Extension Development (JCT-3V) of ITU-T VCEG and ISO/IEC MPEG, Geneva, Switzerland, JCT3V-00093, 2013]. In this approach, the DLT values are updated more regularly in the temporal direction to allow for histogram changes over time. In this case, all the dependent views inherit the base view's DLT as it is assumed that the depth map histogram over all views is the same.

Also, another method to signal DLT values, called range constrained bit map (RCBM) coding 800 as depicted in FIG. 8, was proposed in [Kai Zhang, Jicheng An, Shawmin Lei, "3D-CE6.h related: An efficient coding method for DLT in 3DVC", Document of Joint Collaborative Team on 3D Video Coding Extension Development, JCT3V-00142, January, 2013]. The method 800 uses signaling of a range of depth values that are present in a DLT (see FIG. 8): min_dlt_value and diff_max_dlt_value are coded as unsigned integer to constrain the value range of DLT. The smallest value in DLT is min_dlt_value, and the largest is MaxDltValue, which equals to min_dlt_value+ diff_max_dlt_value. Then, the binary string bit_map_flag is used to signal whether the depth value within the range is present in the DLT or not. If a bit in the bit_map_flag is equal to 1 the depth value corresponding to this position in the binary string belongs to or occurs in the DLT, otherwise the depth value does not belong to or does not occur in the DLT.

Prior art encoding methods for DLT signaling do not fully utilize characteristics of the signal and, consequently, a possibility to further increase coding efficiency of DLT exists.

Signaling the DLT only once per sequence and for each view separately results in a very low overhead for the DLT values, but is relatively inflexible in terms of temporal and spatial (inter-view) updating.

The alternative solution, to signal the DLT in the slice header of I-Slices for the base view and inherit that DLT for the dependent views, lacks the ability to update the lookup table in the temporal direction more regularly and also does not allow for inter-view update of the DLT. The assumption that the DLT values are always the same for all coded views is in many cases too restrictive and results in reduced depth map quality in the dependent views. If a dependent view's depth map shows different histogram characteristics compared to the base view's, then the reconstruction of that depth map cannot even reach all original depth values due to the plain copy of the non-optimal DLT.

SUMMARY

It is the object of the invention to provide an improved coding/decoding technique for a depth lookup table.

This object is achieved by the features of the independent claims. Further implementation forms are apparent from the dependent claims, the description and the figures.

The invention is based on the finding that an improved coding/decoding technique for a depth lookup table can be provided by using DLT prediction. Instead of signaling all values in the current DLT, only a difference between the current DLT and a reference DLT is signaled. Thus, e.g. temporal and inter-view redundancies of the DLT lookup tables can be exploited to reduce the required bitrate for the DLT. In a variant of the DLT prediction, a single flag is used for signaling a zero difference between the current and the reference DLT lookup tables.

A number of prediction scenarios for the DLT coding/ decoding are described, in which different temporal and spatial (inter-view) dependencies between DLT lookup tables can be exploited. Methods are presented that reduce the influence of transmission errors on performance of the prediction-based coding/decoding method. According to these methods, the bit length of values in the higher coding level (e.g. PPS) is signaled and the lost reference DLT is sent in a dedicated SEI message. A simple method to compute the difference between the current and the reference DLT lookup tables based on the XOR logical operator is presented.

In order to describe the invention in detail, the following terms, abbreviations and notations will be used:
HEVC—High-Efficiency Video Coding
CU—Coding Unit
DLT—Depth Lookup Table
RAP—Random Access Point
SEI—Supplemental Enhancement Information
SH—Slice Header
SPS—Sequence Parameter Set
PPS—Picture Parameter Set
video sequence a set of subsequent frames presenting motion picture.
3D video signal comprising two texture views and their corresponding depth or disparity maps.
visual scene real world or synthetic scene that is represented in the 3D video.
depth map a gray scale picture in which the value of every point of the picture
  determines a distance to the camera of the visual scene represented by this point. Alternatively, a disparity map may be used to represent or derive the depth map, which values are inversely proportional to the ones of the depth map.
texture view a video acquired in a specified viewpoint, containing information about color and texture of the visual scene; usually represented in RGB or YUV format.
random access point defined point in the structure of a video sequence from which the decoder is able to start decoding the sequence without the knowledge of the previous part of the video stream.
SPS set of parameters sent in form of an organized message containing basic information required to properly decode the video stream;
  must be signaled at the beginning of every random access point.
PPS set of parameters sent in form of organized message containing basic information required to properly decode a picture in the video sequence.
picture a structure of the video sequence containing whole picture of the video sequence; also referred to as a frame.
slice a structure of the video sequence containing a part or whole picture of the video sequence.
slice header set of parameters describing the slice, sent at the beginning of the slice.
CU a basic coding a structure of the video sequence of a pre-defined size, containing a part of a picture (e.g. 64×64 pixels).
I-slice slice in which all coding units are intra-predicted, so no reference to other pictures is allowed.
SEI message that can be signaled in stream of video sequence, containing additional or optional information about the video sequence, coding tools etc.

According to a first aspect, the invention relates to a method for coding a depth lookup table, the depth lookup table comprising depth value information of at least a part of a 3D picture, the method comprising: selecting a reference depth lookup table; determining a difference depth lookup table based on a comparison between depth value information of the depth lookup table to be coded and depth value information of the reference depth lookup table; and coding depth value information of the difference depth lookup table according to a predetermined coding rule.

This kind of coding may be also referred to as prediction coding, difference coding or differential coding.

In a realization form, "Difference coding" covers both, DLT prediction (e.g. time and view) and updating DLT (e.g. for single view/base view).

In a realization form, depth value information can be indices representing depth values (either as binary string or as sequence of integer index values) or depth values as such. Both options or representations of the DLT can be referred to as DLT. The DLT is used for encoding and decoding the depth maps.

The term "3D picture" is to be understood as texture information (e.g. RGB, etc) and depth information for a single view. The additional depth information is the difference to a corresponding 2D picture, comprising only the texture information.

A realization form covers DLTs for 3D video (3D picture sequences), single 3D pictures and for "parts" of a 3D picture or 3D picture sequence (e.g. slices, coding units, macro-blocks), and in a specific or extreme case one DLT specific for one time instant, one view and one "part"). In realization forms the DLT can be encoded together with texture information or separately. In further realization forms only the DLT is encoded.

In a realization form, the selecting the reference depth lookup table, e.g. reference DLT, is based on a selection criterion.

In a realization form, the selection criterion is predetermined, that is fixed. In a realization form, the selection criterion is adoptable.

In a realization form, the determining the difference depth lookup table, e.g. delta-DLT, is based on a comparison between depth value information of the depth lookup table to be coded, e.g. current DLT, and depth value information comprised in the reference depth lookup table, e.g. reference DLT.

In a realization form, the predetermined coding rule is the same as used for coding the reference DLT, i.e. "normal coding of full DLT", e.g. range constrained bit map coding for coding the reference DLT and for coding the difference DLT.

The new presented method of Depth Lookup Table coding/decoding provides high flexibility for the encoder/decoder while reducing the required bitrate for the DLT at the same time. As depth map characteristics may vary significantly between different sequences and even within the same sequence (between frames and between views), high flexibility for coding/decoding the DLT is provided by realizations of this method.

In order to utilize the similarity between DLT lookup tables representing values for different time instances (in case of video sequence) or time instances and views (in case of a multi-view sequence), the new method for DLT coding/decoding presented herewith uses DLT prediction of DLT values to decrease the amount of information that needs to be encoded/decoded to represent the DLT lookup table.

In a first possible implementation form of the method according to the first aspect, the difference depth lookup table comprises depth value information occurring in the depth lookup table to be coded and not occurring in the reference depth lookup table and comprises depth value information occurring in the reference lookup table and not occurring in the depth lookup table to be coded.

When the difference depth lookup table comprises such depth value information, the coding of the depth lookup table can be achieved very efficiently, and the difference encoded DLT requires less bits or bandwidth compared to the conventionally encoded DLT.

In a realization form, the comparison is based on comparing depth values as such or integer indices. In a realization form, the comparison is based on comparing the existence or occurrence (1) of depth value indices, e.g. in a binary string.

In a second possible implementation form of the method according to the first aspect as such or according to the first implementation form of the first aspect, the occurrence of depth values in the depth lookup table to be coded and the occurrence of depth values in the reference depth lookup table is represented as binary strings, wherein a first binary value, e.g. "1", of the binary strings indicates the occurrence of a depth value, in particular the occurrence an individual depth value, in the corresponding depth lookup table, and a second binary value, e.g. "0", of the binary strings indicates the non-occurrence of a depth value, in particular the non-occurrence an individual depth value, in the corresponding depth lookup table.

By using such binary strings, the coding is reduced to indicating a presence or non-presence, or occurrence and non-occurrence, of a depth value in the DLT which allows a very efficient coding.

In a realization form, the first binary value of the binary string is a binary "1" and the second binary value of the binary string is a binary "0". In other realization forms, the first binary value of the binary string is a binary "0" and the second binary value of the binary string is a binary "1".

In a realization form, the occurrence of individual depth values in the depth lookup table to be coded and the occurrence of individual depth values in the reference depth lookup table is represented as binary strings, wherein a first binary value ("1") of the binary strings indicates the occurrence of an individual depth value in the corresponding depth lookup table.

In a third possible implementation form of the method according to the second implementation form of the first aspect, the determining the difference depth lookup table comprises: applying one of a logical XOR operation and a logical XNOR operation to the binary strings representing the depth value information of the depth lookup table to be coded and the depth value information of the reference depth lookup table.

Logical XOR gates or XNOR gates are standard circuits which are easy to implement.

In a fourth possible implementation form of the method according to the first aspect as such or according to any of the preceding implementation forms of the first aspect, the method further comprises: coding depth value information of the reference lookup table using a range constrained bit map coding of the reference depth lookup table; wherein the coding the depth value information of the difference depth lookup table is also performed using a range constrained bit map coding of the difference depth lookup table.

Using a range constrained bit map coding of the difference depth lookup table is an efficient coding as the range of coding values is constrained, in other words the length of the binary string is reduced, thereby providing a reduced amount of information.

In a fifth possible implementation form of the method according to the first aspect as such or according to any of the preceding implementation forms of the first aspect, the method comprises: using a flag for indicating an identity between the depth lookup table to be coded and the reference depth lookup table.

In a sixth possible implementation form of the method according to the fifth implementation form of the first aspect, the coding the difference depth lookup table according to a predetermined coding rule is reduced to providing that flag if the flag indicates identity between the depth lookup table to be coded and the reference depth lookup table.

By using this flag, the whole depth lookup table can be coded, in case of identity between depth lookup table and reference lookup table, by a single bit which is a very efficient representation of information.

In a seventh possible implementation form of the method according to the first aspect as such or according to any of the preceding implementation forms of the first aspect, the reference depth lookup table is selected among, for example previously coded, depth lookup tables for other 3D pictures associated to other views, for other 3D pictures associated to other views and/or time instances of a 3D video sequence comprising the 3D picture, or for other parts of the same 3D picture, for a corresponding part of another 3D picture associated to other views and/or time instances, wherein a part of the 3D picture comprises a slice, a coding unit, a coding block, or a macro block of the 3D picture.

When selecting the reference depth lookup table among other, for example previously coded, depth lookup tables, the reference depth lookup table can easily be provided.

In an eighth possible implementation form of the method according to the seventh implementation form of the first aspect, in case of a single-view video sequence the reference depth lookup table is selected among, for example previously coded, depth lookup tables for other time instances, in particular among previously coded depth lookup tables for one of intra-periods, pictures and slices of a 3D video sequence comprising the 3D picture.

When the reference depth lookup table is selected among, for example previously coded, depth lookup tables for other time instances, a lot of DLTs is available for selection.

In a ninth possible implementation form of the method according to the seventh implementation form of the first aspect, in case of a multi-view video sequence the reference depth lookup table is selected among previously coded depth lookup tables for other views and/or time instances of the multi-view video sequence, in particular among previously coded depth lookup tables for one of intra-periods, pictures and slices of a 3D video sequence comprising the 3D picture.

When the reference depth lookup table is selected among previously coded depth lookup tables for other views and/or time instances, the best DLT, e.g. in terms of coding gain, for starting prediction can be selected.

In a tenth possible implementation form of the method according to the first aspect as such or according to any of the preceding implementation forms of the first aspect, the reference depth lookup table is selected among, for example previously coded, depth lookup tables of a same coding level, in particular of a slice header coding level, a coding unit coding level, a SPS coding level, a PPS coding level or a SEI coding level.

When the reference depth lookup table is selected among, for example previously coded, depth lookup tables of a same coding level, the reference DLT can easily be found.

In an eleventh possible implementation form of the method according to the first aspect as such or according to any of the preceding implementation forms of the first aspect, the reference depth lookup table is selected among, for example previously coded, depth lookup tables of a higher coding level, in particular of a slice header coding level, a picture header coding level, a picture parameter set coding level, a SPS coding level, a SEI coding level, an SPS coding level, a picture header coding level, a slice header coding level or a SEI coding level.

When the reference depth lookup table is selected among, for example previously coded, depth lookup tables of a higher coding level, a single reference DLT can be used for multiple DLTs to be predicted.

Coding level and ranking of levels is defined, for example, starting from a lowest "macroblock level" to a highest "SPS level".

In a twelfth possible implementation form of the method according to the first aspect as such or according to any of the preceding implementation forms of the first aspect, the method further comprises: protecting the difference depth lookup table against corruptions of the reference depth lookup table, in particular by signaling a bit length of the depth values of the reference depth lookup table in a higher coding level, in particular in a slice header coding level, a picture header coding level, a picture parameter set coding level, a SPS coding level, a SEI coding level, a picture header coding level or a slice header coding level; or by sending a lost reference depth lookup table in a dedicated supplemental enhancement information, SEI, message.

When signaling a bit length of the depth values of the reference depth lookup table in a higher coding level, the difference DLT can be efficiently protected against corruptions.

In a thirteenth possible implementation form of the method according to the first aspect as such or according to any of the preceding implementation forms of the first aspect, the coding the difference depth lookup table comprises a range constrained bit map coding according to 3D Video Coding Extension Development of ITU-T and ISO/IEC standardization.

When the coding the difference depth lookup table comprises a range constrained bit map coding according to 3D Video Coding Extension Development of ITU-T and ISO/IEC standardization, the method is compliant to the standards.

In a fourteenth possible implementation form of the method according to the first aspect as such or according to any of the preceding implementation forms of the first aspect, the method further comprises: coding depth value information of the reference lookup table using the same coding algorithm as used for coding the depth value information of the difference depth lookup table, e.g. range constrained bit map coding for coding the reference DLT and for coding the difference DLT.

Coding depth value information of the reference lookup table using the same coding algorithm is highly efficient, as only one coding algorithm has to be implemented for coding conventional DLTs and difference DLTs.

According to a second aspect, the invention relates to an apparatus for coding a depth lookup table, the depth lookup table comprising depth value information of at least a part of a 3D picture, the apparatus comprising a processor configured to implement a method according to the first aspect as such or according to any of the preceding implementation forms of the first aspect.

This kind of coding may be also referred to as prediction coding, difference coding or differential coding.

In a realization form, "Difference coding" covers both, DLT prediction (e.g. time and view) and updating DLT (e.g. for single view/base view).

In a realization form, depth value information can be indices representing depth values (either as binary string or as sequence of integer index values) or depth values as such. Both options or representations of the DLT can be referred to as DLT. The DLT is used for encoding and decoding the depth maps.

The term "3D picture" is to be understood as texture information (e.g. RGB, etc) and depth information for a single view. The additional depth information is the difference to a corresponding 2D picture, comprising only the texture information.

A realization form covers DLTs for 3D video (3D picture sequences), single 3D pictures and for "parts" of a 3D picture or 3D picture sequence (e.g. slices, coding units, macro-blocks), and in a specific or extreme case one DLT specific for one time instant, one view and one "part"). In realization forms the DLT can be encoded together with texture information or separately. In further realization forms only the DLT is encoded.

In a realization form, the selecting the reference depth lookup table, e.g. reference DLT, is based on a selection criterion.

In a realization form, the selection criterion is predetermined, that is fixed. In a realization form, the selection criterion is adoptable.

In a realization form, the determining the difference depth lookup table, e.g. delta-DLT, is based on a comparison between depth value information of the depth lookup table to be coded, e.g. current DLT, and depth value information comprised in the reference depth lookup table, e.g. reference DLT.

In a realization form, the predetermined coding rule is the same as used for coding the reference DLT, i.e. "normal coding of full DLT", e.g. range constrained bit map coding is for coding the reference DLT and for coding the difference DLT.

The new presented apparatus for Depth Lookup Table coding/decoding provides high flexibility for the encoder/decoder while reducing the required bitrate for the DLT at the same time. As depth map characteristics may vary significantly between different sequences and even within the same sequence (between frames and between views), high flexibility for coding/decoding the DLT is provided by realizations of this apparatus.

In order to utilize the similarity between DLT lookup tables representing values for different time instances (in case of video sequence) or time instances and views (in case of a multi-view sequence), the apparatus for DLT coding/decoding presented herewith uses DLT prediction of DLT values to decrease the amount of information that needs to be encoded/decoded to represent the DLT lookup table.

The explanations provided for the first aspect and its implementations and realizations apply correspondingly for the second aspect and its implementations and realizations.

According to a third aspect, the invention relates to a method for providing a representation of a depth lookup table associated to at least a part of a 3D picture, the method comprising: providing the depth lookup table associated to at least the part of the 3D picture by adding to the representation of the depth lookup table depth value information, which is present in the same kind of representation of a difference depth lookup table associated to at least the part of a 3D picture and which is not present in a representation of a reference depth lookup table; copying to the depth lookup table depth value information of the representation of the reference DLT, which is not present in the representation of the difference depth lookup table.

The method for providing a representation of a depth lookup table associated to at least a part of a 3D picture can also be referred to as method for decoding a depth lookup table, in particular a method for prediction decoding, difference decoding or differential decoding a depth lookup table or a corresponding representation of the depth lookup table.

The new presented method for providing a representation of a Depth Lookup Table provides high flexibility for the encoding and decoding while reducing the required bitrate for transmitting or storing the encoded DLT at the same time. As depth map characteristics may vary significantly between different sequences and even within the same sequence (between frames and between views), high flexibility for encoding and decoding the DLT is provided.

In a first possible implementation form of the method according to the third aspect, the representation of the difference depth lookup table corresponds to the difference lookup table, e.g. difference DLT, and the representation of the reference lookup table corresponds to the reference lookup table, and the depth value information corresponds to the depth values.

Thus, the method provides a high degree of flexibility as any difference lookup table, reference lookup table and depth values can be used for this method.

The term "corresponds" can have the meaning of "is" or the meaning of "is formed by".

In a second possible implementation form of the method according to the first implementation form of the third aspect, the method further comprises: decoding an encoded representation of the difference depth lookup table to obtain the difference lookup table; and decoding an encoded representation of the reference depth lookup table to obtain the reference lookup table.

Such a decoding is a highly efficient kind of decoding as further encoded, e.g. index encoded, binary string encoded or range constrained bit map encoded, representations of the difference depth lookup table and of the reference depth lookup table are used.

In a third possible implementation form of the method according to the third aspect as such, the representation of the difference depth lookup table corresponds to a difference list of indices representing depth values of the corresponding difference lookup table, the representation of the reference depth lookup table corresponds to a reference list of indices representing depth values of the corresponding reference lookup table, and wherein the depth value information corresponds to the indices, i.e. the depth value indices.

Applying indices and lists of indices offers high flexibility at low computational complexity.

In a fourth possible implementation form of the method according to the third aspect as such, the representation of the difference depth lookup table corresponds to a difference binary string comprising a string of binary values, wherein a position of a binary value is associated to a depth value and a first binary value "1" of a binary value indicates the occurrence of the depth value in a corresponding difference lookup table, the representation of the reference depth lookup table corresponds to a reference binary string comprising a string of binary values, wherein a position of a binary value is associated to a depth value and the first binary value "1" of a binary value indicates the occurrence of the depth value in the corresponding reference lookup table, and wherein the depth value information corresponds to the binary strings or the first binary values.

Such binary strings and binary values can be efficiently processed.

In a fifth possible implementation form of the method according to the third aspect as such or according to any of the preceding implementation forms of the third aspect, the representation of the difference depth lookup table corresponds to a range constrained bit map, RCBM, coded difference binary string, and the representation of the reference depth lookup table corresponds to a range constrained bit map, RCBM, coded reference binary string.

A range constrained bitmap is a very efficient way of representing information as the range of values is constrained thereby reducing the amount of information to be processed.

In a sixth possible implementation form of the method according to the third aspect as such or according to any of the preceding implementation forms of the third aspect, the method further comprises: analyzing a flag for indicating an identity between the representation of the depth lookup table and the representation of the reference depth lookup table; in case the flag indicates an identity, using the representation of the reference depth lookup table as representation of the depth lookup table associated to at least the part of a 3D picture.

Using a flag allows reduction of a depth lookup table to a single bit which is a very efficient way of decoding.

In a realization form, analyzing a flag specifies parsing for a flag in a bitstream, the bitstream comprising data associated to the representation of the depth lookup table.

In a seventh possible implementation form of the method according to the third aspect as such or according to any of the preceding implementation forms of the third aspect, the reference depth lookup table is selected among, for example previously decoded, depth lookup tables for other 3D pictures associated to other views, for other 3D pictures associated to other views and/or time instances of a 3D video sequence comprising the 3D picture, or for other parts of the (same) 3D picture, for a corresponding part of another 3D picture associated to other views and/or time instances, wherein a part of the 3D picture comprises a slice, a coding unit, a coding block, or a macro block of the 3D picture.

When the reference depth lookup table is selected among, for example previously decoded, depth lookup tables for other 3D pictures associated to other views, a broad data base is available for selecting the optimum reference DLT, for example optimum with regard to coding gain.

In an eighth possible implementation form of the method according to the third aspect as such or according to any of the preceding implementation forms of the third aspect, the method further comprises: analyzing a type indicator comprised in a coding unit coding level, a slice header coding level, a picture header coding level, a picture parameter set coding level, a SPS coding level or a SEI coding level, the type indicator indicating whether the representation of the depth lookup table is difference encoded; and difference decoding the depth lookup table associated to at least the part of the 3D picture according to the first aspect as such or according to any of the preceding implementation forms of the first aspect in case the type indicator indicates that representation of the depth lookup table is difference encoded.

By using the type indicator, a decision whether to difference decode or conventionally decode the DLT can be efficiently provided.

In a realization form, analyzing a type indicator specifies parsing for a type indicator (flag, single or more bits) in a bitstream, the bitstream comprising data associated to the representation of the depth lookup table.

In a ninth possible implementation form of the method according to the third aspect as such or according to any of the preceding implementation forms of the third aspect, the method further comprises: analyzing a type indicator comprised in a coding unit coding level, a slice header coding level, a picture header coding level, a picture parameter set coding level, a SPS coding level or a SEI coding level, the type indicator indicating a type of difference encoding used for encoding the representation of the depth lookup table; selecting a representation of a reference depth lookup table according to the type indicator; and providing the representation of the depth lookup table associated to at least the part of the 3D according to the first aspect as such or according to any of the preceding implementation forms of the first aspect.

When analyzing the type of difference encoding used for encoding the representation of the depth lookup table, the corresponding decoding and reference depth lookup table, in a representation suitable for decoding, can be chosen based on that type information. The correct decoding can thus be selected.

In a realization form, the type indicator indicates a type of difference encoding used for difference encoding the representation of the depth lookup table.

In a realization form, analyzing a type indicator specifies parsing for a type indicator (flag, single or more bits) in a bitstream, the bitstream comprising data associated to the representation of the depth lookup table.

In a realization form, the type indicator determines the DLT representation. In a realization form, the type indicator determines which DLT is used as the reference DLT.

In a realization form, the selecting a representation of a reference depth lookup table specifies a difference decoding of the reference depth lookup table.

In a tenth possible implementation form of the method according to the third aspect as such or according to any of the preceding implementation forms of the third aspect, in case of a single-view video sequence the representation of the reference depth lookup table corresponds to a depth lookup table associated to another time instance, in particular to a depth lookup table for one of intra-periods, pictures and slices of a 3D video sequence comprising the 3D picture.

Such reference DLT allows flexible decoding. The decoding can be applied for single-view and multi-view video sequences.

In an eleventh possible implementation form of the method according to the third aspect as such or according to any of the preceding implementation forms of the third aspect, in case of a multi-view video sequence the representation of the reference depth lookup table corresponds to a depth lookup tables associated for other views and/or time instances of the multi-view video sequence, in particular to depth lookup tables for one of intra-periods, pictures and slices of a 3D video sequence comprising the 3D picture.

Such reference DLT allows flexible decoding. The decoding can be applied for single-view and multi-view video sequences.

In a twelfth possible implementation form of the method according to the third aspect as such or according to any of the preceding implementation forms of the third aspect, the representation of the reference depth lookup table corresponds to a depth lookup table of a same coding level, in particular of a slice header coding level, a coding unit coding level, a SPS coding level, a PPS coding level or a SEI coding level.

When the representation of the reference depth lookup table corresponds to a depth lookup table of a same coding level, the decoding can be efficiently performed.

In a thirteenth possible implementation form of the method according to the third aspect as such or according to any of the preceding implementation forms of the third aspect, the representation of the reference depth lookup table corresponds to a depth lookup table of a same slice header coding level, a same coding unit coding level, a same SPS coding level, a same PPS coding level or a same SEI coding level.

When the representation of the reference depth lookup table corresponds to a depth lookup table of a same coding level, the decoding can be efficiently performed.

In a fourteenth possible implementation form of the method according to the third aspect as such or according to any of the preceding implementation forms of the third aspect, the representation of the reference depth lookup table corresponds to a depth lookup table of a higher coding level, in particular of a slice header coding level, a picture parameter set coding level, a SPS coding level or a SEI coding level.

When the representation of the reference depth lookup table corresponds to a depth lookup table of a higher coding level, the decoding can be efficiently performed as a single reference DLT can be used for decoding multiple DLTs.

In a fifteenth possible implementation form of the method according to the third aspect as such or according to any of the preceding implementation forms of the third aspect, the difference depth lookup table comprises depth value information occurring in the depth lookup table to be coded and not occurring in the reference depth lookup table and comprises depth value information occurring in the reference lookup table and not occurring in the depth lookup table to be coded.

When the difference depth lookup table comprises depth value information occurring in the depth lookup table to be coded and not occurring in the reference depth lookup table and comprises depth value information occurring in the reference lookup table and not occurring in the depth lookup table to be coded, the decoding can be performed in an efficient way as redundant information is removed.

According to a fourth aspect, the invention relates to an apparatus for providing a representation of a depth lookup table associated to at least a part of a 3D picture, the apparatus comprising a processor configured: to add to the representation of the depth lookup table depth value information, which is present in a same kind of representation of a difference depth lookup table associated to at least the part of a 3D picture and which is not present in a representation of a reference depth lookup table; and to add or copy to the depth lookup table depth value information of the representation of the reference DLT, which is not present in the representation of the difference depth lookup table.

Such apparatus for providing a DLT provides high flexibility for the encoding/decoding while reducing the required bitrate for the DLT at the same time. As depth map characteristics may vary significantly between different sequences and even within the same sequence (between frames and between views), high flexibility for encoding/decoding the DLT is provided.

According to a fifth aspect, the invention relates to an apparatus for providing a depth lookup table associated to at least a part of a 3D picture, the apparatus comprising a processor configured to implement a method according to the third aspect as such or according to any of the preceding implementation forms of the third aspect.

Such apparatus for providing a DLT provides high flexibility for the encoding/decoding while reducing the required bitrate for the DLT at the same time.

According to a sixth aspect, the invention relates to a method for encoding DLT lookup tables in a 3D video sequence, the method comprising: determining which DLT undergoes a prediction process based on pre-defined criteria and which is not predicted; computing a difference between said predicted DLT and a correspondent reference DLT obtaining a delta-DLT; and encoding an input signal as in the prior art.

Such method for providing DLTs provides high flexibility for the encoding while reducing the required bitrate for the DLT at the same time.

According to a seventh aspect, the invention relates to a method for decoding a DLT table, wherein the decoding is corresponding to the coding of the sixth aspect.

When the decoding is corresponding to the coding, the method can be easily implemented, because only one hardware or software function is required.

In a first possible implementation form according to the sixth aspect or according to the seventh aspect, the reference and delta-DLT can be adaptively selected depending on the context (e.g. if the input signal is delta-DLT or reference DLT).

Such adaptive selection provides a high degree of flexibility.

In a second possible implementation form according to the sixth aspect or according to the seventh aspect, the method comprises signaling a zero delta-DLT using a single flag.

Signaling by using a single flag is highly computationally efficient as only one flag is required.

In a third possible implementation form according to the sixth aspect or according to the seventh aspect, the method comprises computing the current DLT from the reference DLT and the delta-DLT.

Computing the current DLT from a reference DLT and a delta-DLT is flexible because it can be implemented syntax independently.

In a fourth possible implementation form according to the sixth aspect or according to the seventh aspect, the method comprises computing current DLT from reference DLT and delta-DLT for binary representation of DLT using XOR or XNOR logical operator.

XOR or XNOR logical operators are standard gate functions that can be efficiently implemented in hardware or in software.

In a fifth possible implementation form according to the sixth aspect or according to the seventh aspect, the method comprises DLT prediction scenarios.

Using DLT prediction scenarios allows a high degree of flexibility.

In a sixth possible implementation form according to the sixth aspect or according to the seventh aspect, the method comprises hierarchical DLT signaling.

Hierarchical DLT signaling is easy to implement.

In a seventh possible implementation form according to the sixth aspect or according to the seventh aspect, the method comprises minimizing the influence of possible transmission errors by signaling the bit length of DLT values in the higher coding level than the one used to signal DLTs (e.g. PPS).

Signaling the bit length of DLT values in the higher coding level allows reducing the influence of transmission errors.

In an eighth possible implementation form according to the sixth aspect or according to the seventh aspect, the method comprises recovering reference DLT using SEI message.

By using SEI message, the reference DLT can easily be recovered.

According to an eighth aspect, the invention relates to a method utilizing a DLT prediction mechanism whenever the DLT is used as a coding tool.

In a first possible implementation form according to the eighth aspect, the method comprises making a usage of DLT prediction switchable per sequence, per view, per picture, per slice and/or per coding unit.

Therefore, DLT prediction is flexible to be switched per sequence, per view, per picture, per slice and/or per coding unit.

In a second possible implementation form according to the eighth aspect, the method comprises signaling in SPS, PPS, Picture Header, SH, or Coding Unit syntax.

The signaling thus can be performed in different syntax entities. Therefore, the method can be flexibly applied in such syntax entities.

In a third possible implementation form according to the eighth aspect, the method comprises signaling the bit depth of DLT values per sequence, in particular per SPS, per picture, in particular per PPS and per slice.

Thus, the bit depth of DLT values can be flexibly signaled.

In a fourth possible implementation form according to the eighth aspect, the method comprises signaling the prediction functionality per picture and/or per slice.

Thus, the prediction functionality can be flexibly signaled.

According to the invention, the fact of using the DLT prediction and/or type of selected DLT prediction type can be signaled in SPS, PPS, Picture Header, SH or CU using a dedicated syntax modification of these syntax elements. Also, the invention proposes a dedicated SEI message which consists of typical SEI message header with a SEI message type indicating that the SEI message consists of DLT prediction setup, a flag indicating if the DLT prediction is used and/or a value specifying the DLT prediction type to be used.

The methods, systems and devices described herein may be implemented as software in a Digital Signal Processor (DSP), in a micro-controller or in any other side-processor or as hardware circuit within an application specific integrated circuit (ASIC).

The invention can be implemented in digital electronic circuitry, or in computer hardware, firmware, software, or in combinations thereof, e.g. in available hardware of conventional mobile devices or in new hardware dedicated for processing the methods described herein.

BRIEF DESCRIPTION OF THE DRAWINGS

Further embodiments of the invention will be described with respect to the following figures, in which.

BRIEF DESCRIPTION OF THE DRAWINGS

Figure 1:
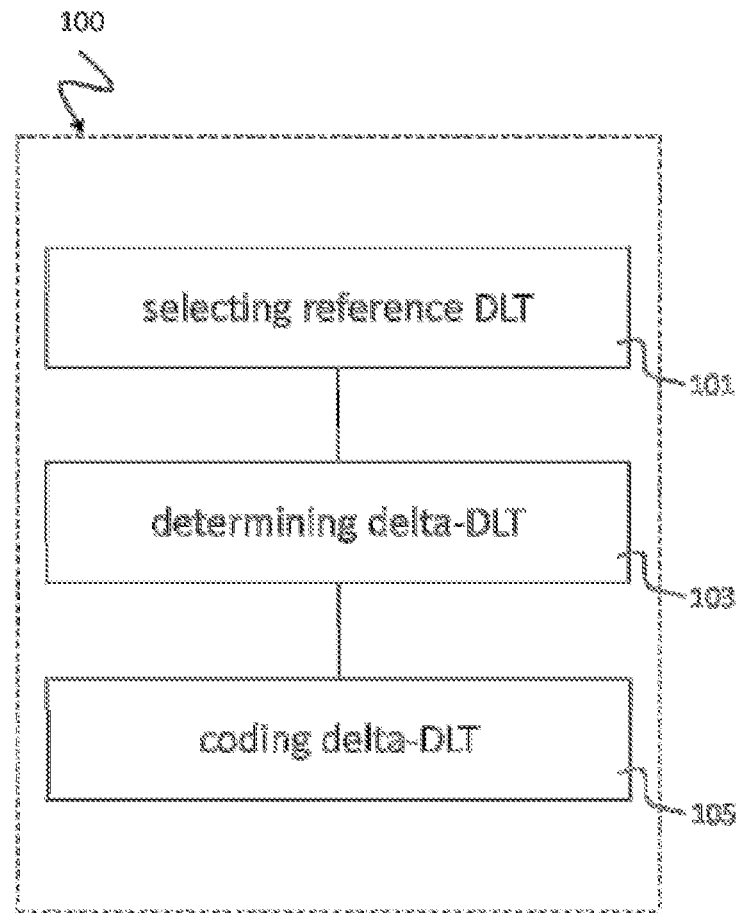
FIG. 1 shows a schematic diagram illustrating a method 100 for coding a depth lookup table (DLT) according to an implementation form.

FIG. 1 shows a schematic diagram illustrating a method 100 for coding a depth lookup table (DLT) according to an implementation form. The depth lookup table comprises depth value information of at least a part of a 3D picture. The method 100 comprises selecting 101 a reference depth lookup table, also referred to as reference DLT. The method 100 comprises determining 103 a difference depth lookup table, also referred to as difference DLT or delta-DLT, based on a comparison between depth value information of the depth lookup table to be coded, also referred to as current DLT, and depth value information of the reference depth lookup table. The method 100 comprises coding 105 depth value information of the difference depth lookup table (delta-DLT) according to a predetermined coding rule.

In an implementation form, the difference depth lookup table (delta-DLT) comprises depth value information occurring in the depth lookup table to be coded (current DLT) and not occurring in the reference depth lookup table (reference DLT) and comprises depth value information occurring in the reference lookup table (reference DLT) and not occurring in the depth lookup table to be coded (current DLT).

In an implementation form, the occurrence of depth values in the depth lookup table to be coded (current DLT) and the occurrence of depth values in the reference depth lookup table (reference DLT) is represented as binary strings, wherein a first binary value of the binary strings indicates the occurrence of an individual depth value in the corresponding depth lookup table.

In an implementation form, the determining the difference depth lookup table (delta-DLT) comprises: applying one of a logical XOR operation and a logical XNOR operation to the binary strings representing the depth value information of the depth lookup table to be coded (current DLT) and the depth value information of the reference depth lookup table (reference DLT).

In an implementation form, the method 100 further comprises: coding depth value information of the reference lookup table using a range constrained bit map coding of the reference depth lookup table; wherein the coding the depth value information of the difference depth lookup table (delta-DLT) is also performed using a range constrained bit map coding of the difference depth lookup table.

In an implementation form, the method comprises: using a flag for indicating an identity between the depth lookup table to be coded (current DLT) and the reference depth lookup table (reference DLT).

In an implementation form, the method 100 further comprises: protecting the difference depth lookup table (delta-DLT) against corruptions of the reference depth lookup table (reference DLT), in particular by signaling a bit length of the depth values of the reference depth lookup table (reference DLT) in a higher coding level; or by sending a lost reference depth lookup table (reference DLT) in a dedicated supplemental enhancement information, SEI, message.

In an implementation form, the coding the difference depth lookup table (delta-DLT) comprises a range constrained bit map coding according to 3D Video Coding Extension Development of ITU-T and ISO/IEC standardization.

Figure 2A:
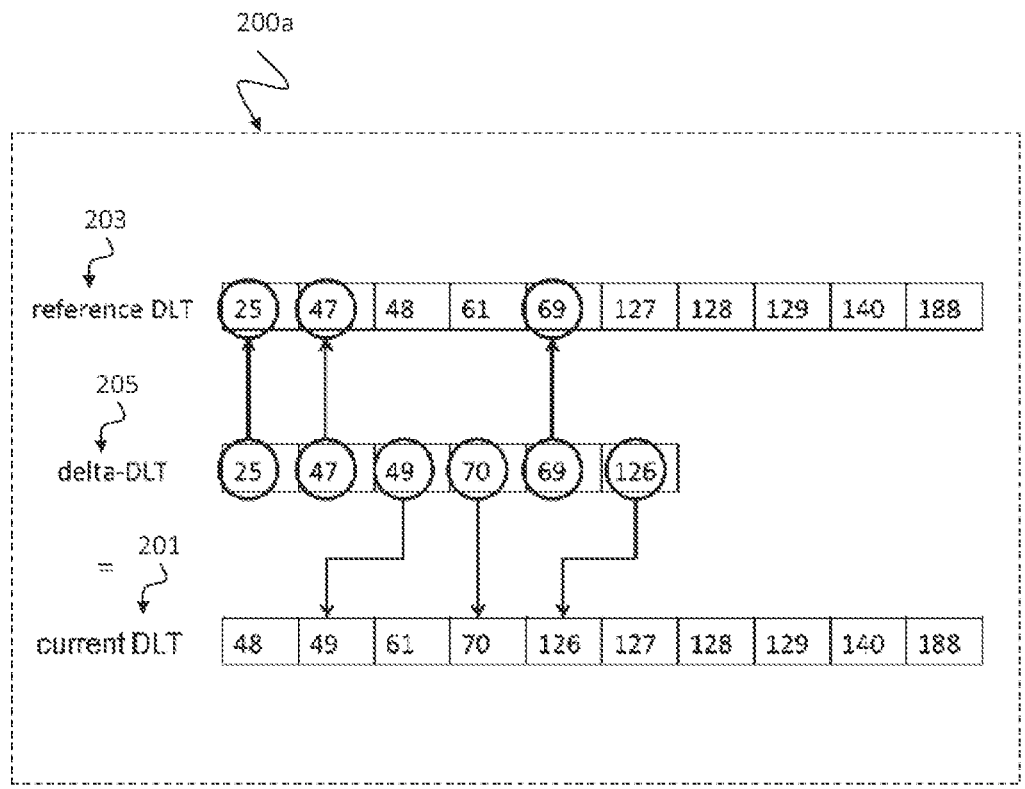
FIG. 2*a* shows a schematic diagram illustrating a method of computing the current DLT based on delta-DLT and reference DLT by comparing DLT values according to an implementation form.

FIG. 2a shows a schematic diagram illustrating a method 200a of computing the current DLT 201 based on delta-DLT 205 and reference DLT 203 by comparing DLT values according to an implementation form.

The current DLT 201 is the DLT that is currently being encoded/decoded. The reference DLT 203 is the DLT that is selected as the reference DLT lookup table, e.g. selected among already encoded/decoded DLT lookup tables, based on a defined ordering. The selection of the reference DLT 203 depends on the prediction scenarios for the DLT coding/decoding that is used and availability of already encoded/decoded DLTs. If no reference DLT is available, the current DLT 201 is encoded/decoded using the prior art.

According to FIG. 2a, instead of signaling the range of values in the current DLT 201 that are to be encoded/decoded, only a difference between the current DLT 201 and the reference DLT 203 within a range is signaled. The difference, called delta-DLT 205 consists of both, new values that are present in the current DLT 201 but are not present in the reference DLT 203, and values that are not present in the current DLT 201 but are present in the reference DLT 203. Consequently, based on the reference DLT 203 and delta-DLT 205, the current DLT 201 can be decoded or computed using the following procedure (see FIG. 2a):

For each value in the delta-DLT 205, it is checked whether the particular value is also present in the reference DLT 203. If the value is present in the reference DLT 203, that corresponding value is not added to the current DLT, i.e. that corresponding value is removed. If the value is not present in the reference DLT 203, that corresponding value is added to the current DLT, i.e. the value is added. All other values of the reference DLT 203 are copied or added to the current DLT.

Figure 2B:
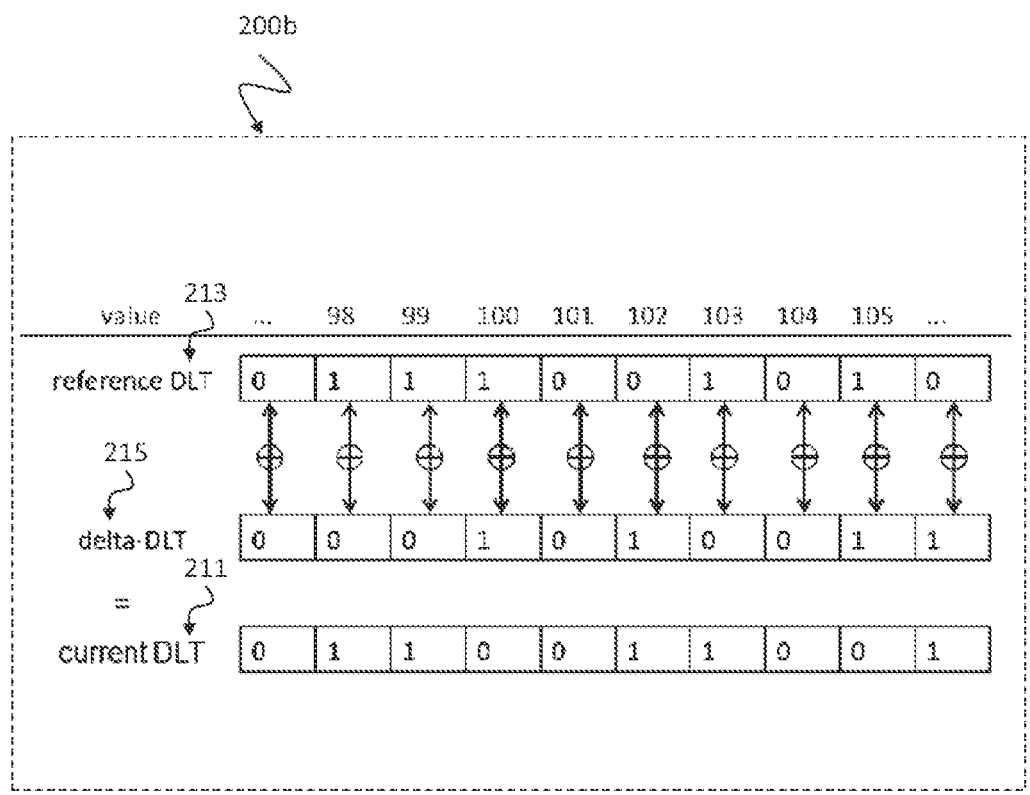
FIG. 2*b* shows a schematic diagram illustrating a method of computing the current DLT based on delta-DLT and reference DLT by comparing binary strings representing DLT values according to an implementation form.

FIG. 2b shows a schematic diagram illustrating a method 200b of computing the current DLT 211 based on delta-DLT 215 and reference DLT 213 by comparing binary strings representing DLT values according to an implementation form.

If the range of values in the DLT is represented as a binary string, e.g. in a range constrained bit map DLT coding method called RCBM as described in the prior art (cf. [Kai Zhang, Jicheng An, Shawmin Lei, "3D-CE6.h related: An efficient coding method for DLT in 3DVC", Document of Joint Collaborative Team on 3D Video Coding Extension Development, JCT3V-00142, January, 2013]), the difference between current DLT 211 and reference DLT 213, i.e. the delta-DLT 215, can be efficiently computed using the XOR (exclusive OR) logical operator. In such a case, a binary string representing the difference between the current 211 and the reference DLTs 213 is equal to the XOR operator applied to binary strings representing the concerned range of values in two DLTs. As a result, the binary string representing the difference DLT 215 can be computed by applying the XOR operator to the binary strings representing the reference DLT 213 and the current DLT 211 (cf. FIG. 2b). In an alternative realization, an XNOR operator is used in the process of computing the binary string representing the delta-DLT 215.

On the other hand, at the decoding side, the original current DLT 211 can be efficiently obtained or computed based on the reference DLT 213 and the delta-DLT 215 by applying the XOR (exclusive OR) logical operator. In such a case, the binary string representing the current DLT 211 is equal to the XOR operator applied to the binary strings representing the reference DLT 213 and delta DLT 215 in the concerned range of values. As a result, the binary string representing the current DLT 211 can be computed by applying the XOR operator to the binary strings representing the reference DLT 213 and the delta-DLT 215 (cf. FIG. 2*b*). In an alternative realization, an XNOR operator is used in the process of computing the binary string representing the delta-DLT 215 and the reference DLT 211 to obtain the reference DLT 213.

The more similar the current DLT and reference DLT are, e.g. the more depth values or corresponding depth value information they have in common, the smaller the number of depth values in the corresponding delta DLT. Referring to the binary string representation as shown in FIG. 2*b*, the more similar the current DLT 211 and the reference DLT 213 are, the smaller the number of first values ("1" with reference to FIG. 1) in the binary string of the delta-DLT 215, which may also be referred to as difference bit string, i.e. the smaller the amount of information needed for representing the difference encoded current DLT. Referring to the range constrained bit map (RCBM) coding as described based on FIG. 1, similarities of the current DLT 211 and the reference DLT 213 often result in Delta-DLT 215 which show or comprise a reduced range, in FIG. 1 referred to as diff_max_dlt_value, compared to the current DLT encoded directly using RCBM. This leads to a further reduction of bit values to be transmitted or stored for representing the current DLT using the difference coding, or difference RCBM coding, compared to the conventional RCBM coding of the current DLT. At the same time the difference bit string can be encoded using the same algorithms and syntax as used for conventional RCBM, which provides for less complex encoders as described based on FIG. 5.

If the delta-DLT 215 indicates there is no difference between the current 211 and the reference DLT 213, e.g. the delta-DLT only comprises second binary values "0", in an implementation form, a single flag is used to signal such delta-DLT 215. With this method, if the flag is set, delta-DLT 215 indicates that reference 213 and current DLTs 211 are identical and no other information is required to be signaled in the delta-DLT 215, otherwise, the delta-DLT 215 consists of all information that is required to calculate the current DLT 211 based on the reference DLT 213.

The selection of the reference DLT 213 depends on the prediction scenario that is used and, also, the availability of already encoded/decoded DLTs. First encoded/decoded DLT in the random access unit, e.g. sequence signaled e.g. in SPS, or intra-period signaled e.g. in SH of an I-slice cannot utilize the DLT prediction method described here, as no reference DLT 213 is yet available. For encoding/decoding of all other DLTs, the prediction method is applied. If no reference DLT 213 is available, the current DLT 211 is encoded/decoded explicitly according to the prior art, i.e. as described in [Kai Zhang, Jicheng An, Shawmin Lei, "3D-CE6.h related: An efficient coding method for DLT in 3DVC", Document of Joint Collaborative Team on 3D Video Coding Extension Development, JCT3V-00142, January, 2013]. Otherwise, the reference DLT 213 is selected from other already encoded/decoded DLTs to exploit the similarity between the current 211 and the reference DLT 213. In case of single-view video sequence, the reference DLT 213 is in an implementation form selected among DLTs that were encoded/decoded for other time instances, e.g. intra-periods, pictures, slices, etc. In case of a multi-view video sequence, the reference DLT 213 is selected in an implementation form among DLTs that were encoded/decoded in other views of the multi-view video sequence. Consequently, temporal and/or spatial, i.e. inter-view prediction types can be utilized as illustrated in FIG. 3.

Figure 3:
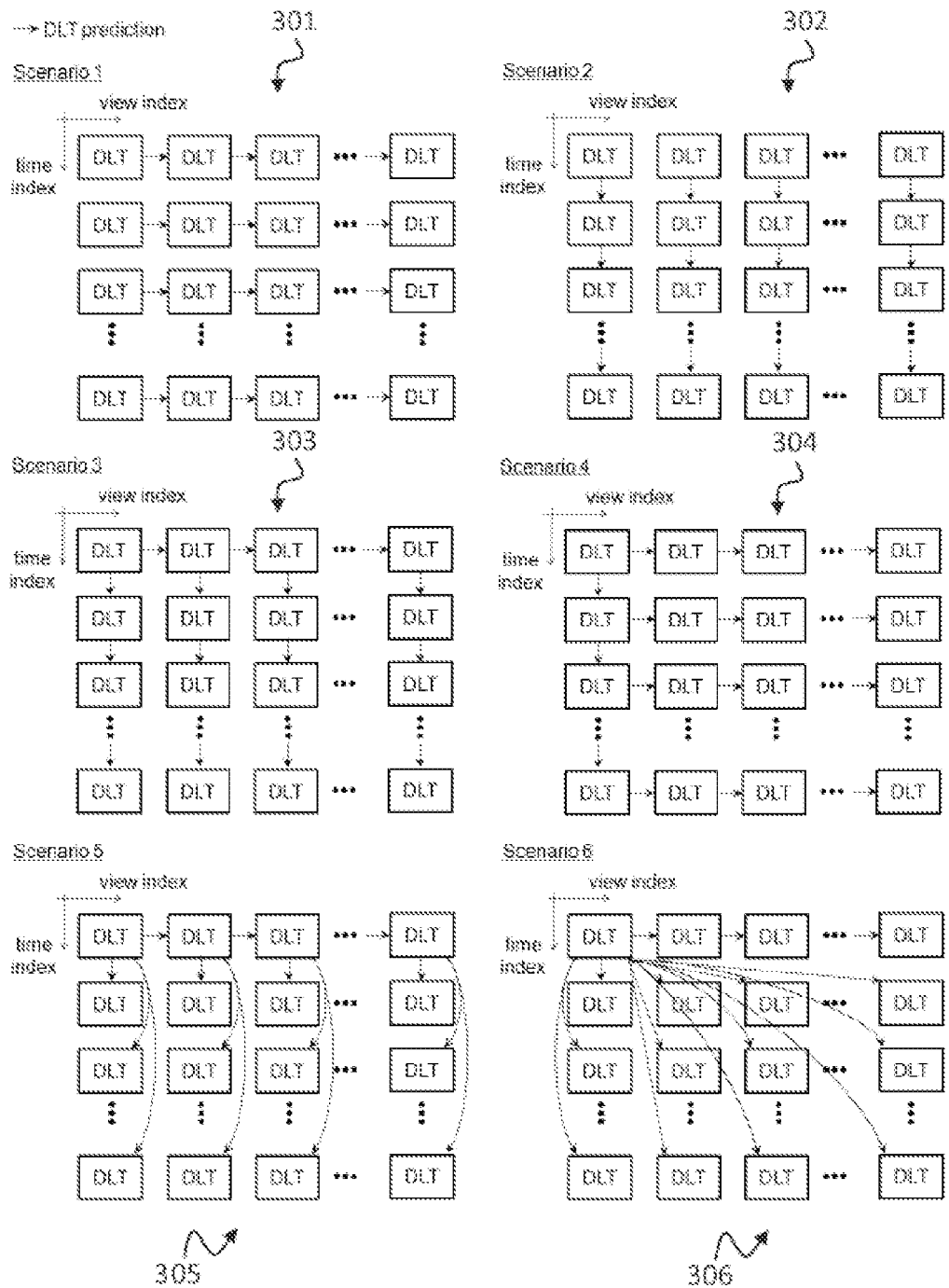
FIG. 3 shows a schematic diagram illustrating different temporal and spatial (inert-view) DLT prediction scenarios according to an implementation form.

FIG. 3 shows a schematic diagram illustrating different temporal and spatial (inert-view) DLT prediction scenarios according to an implementation form.

Scenario 1 depicts a first DLT prediction scenario 301 where DLTs are sequentially predicted only over the view index. Scenario 2 depicts a second DLT prediction scenario 302 where DLTs are sequentially predicted only over the time index. Scenario 3 depicts a third DLT prediction scenario 303 where DLTs are sequentially predicted over the view index and over the time index. A first prediction in scenario 3 is sequentially applied over the view index and results of this sequential view index prediction are sequentially predicted over the time index. Scenario 4 depicts a fourth DLT prediction scenario 304 where DLTs are sequentially predicted over the time index and over the view index. A first prediction in scenario 4 is sequentially applied over the time index and results of this sequential time index prediction are sequentially predicted over the view index. Scenario 5 depicts a fifth DLT prediction scenario 305 where DLTs are sequentially predicted over the view index and parallel predicted over the time index. A first prediction in scenario 5 is sequentially applied over the view index and results of this sequential view index prediction are used for parallel predictions over the time index, i.e. predictions starting from the same sequential view index prediction result. Scenario 6 depicts a sixth DLT prediction scenario 306 where DLTs are sequentially predicted over the view index and parallel predicted over the time and view index. An originating DLT in scenario 6 is used for sequentially view index prediction and used for parallel time and view index prediction, i.e., predictions starting from the same originating DLT in both view index and time index.

Figure 4:
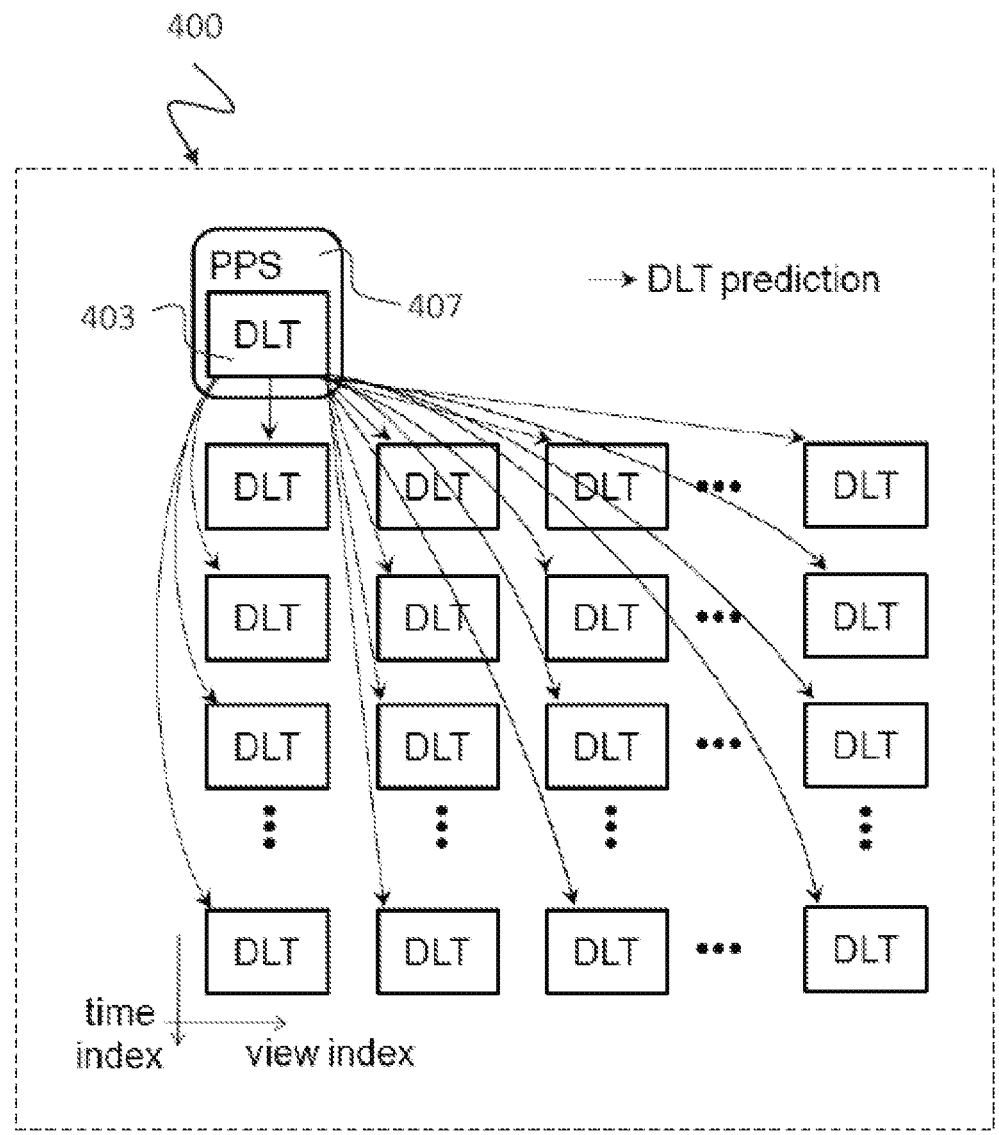
FIG. 4 shows a schematic diagram illustrating hierarchical DLT prediction with common reference DLT signaled in PPS according to an implementation form.

FIG. 4 shows a schematic diagram illustrating hierarchical DLT prediction with common reference DLT signaled in PPS according to an implementation form.

Usually, all DLTs are signaled at the same coding level, e.g. in SH. However, in an implementation form as depicted in FIG. 4, a reference DLT 403 is set in a higher coding level, e.g. in a picture parameter set PPS 407. In such a case, the reference DLT 403 is used in an implementation form as a common reference for encoding/decoding all DLTs within a pre-defined group 409, e.g. an intra-period or other random access unit. FIG. 4 illustrates such a hierarchical signaling method. DLTs are parallel predicted over the time and view index starting from the reference DLT 403. Predictions are starting from the same reference DLT 403 in both view index and time index.

In an implementation form, a method for reducing the influence of transmission errors on the performance of the prediction-based coding/decoding method 100 as described above with respect to FIG. 1 comprises: signaling the bit length of DLT values in the higher coding level, e.g. in PPS. This ensures that the DLT values are decodable, even if an intermediate delta-DLT was lost. By applying that method, the problem that in case a reference DLT is corrupted or not delivered to the decoder, all other DLT that are predicted based on this reference DLT cannot be appropriately decoded, is solved.

In an implementation form, a method for reducing the influence of transmission errors on the performance of the prediction-based coding/decoding method 100 as described above with respect to FIG. 1 comprises: sending the lost reference DLT in dedicated SEI message which consists of typical SEI message header with a SEI message type indicating that the SEI message consists of reference DLT for a particular time instance (POC) and view. Optionally, the SEI message may also consist of reference DLT identifier, determining e.g. time instance (POC) and view from which the signalled reference DLT originates. This ensures that the DLT values are decodable, even if an intermediate delta-DLT was lost. By applying that method, the problem that in case a reference DLT is corrupted or not delivered to the decoder, all other DLT that are predicted based on this reference DLT cannot be appropriately decoded, is solved.

Figure 5:
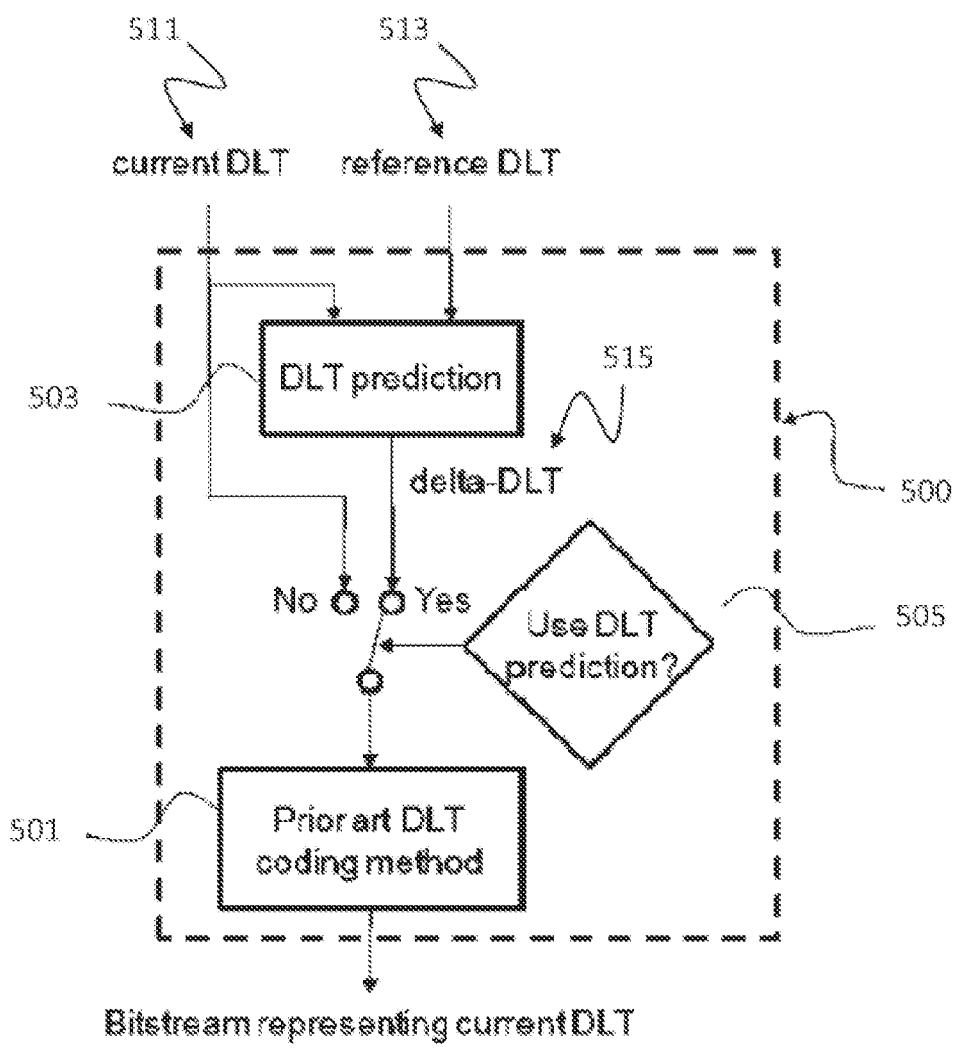
FIG. 5 shows a schematic block diagram of an apparatus for coding a DLT using a DLT prediction algorithm according to an implementation form.

FIG. 5 shows a schematic block diagram of an apparatus 500 for coding a DLT using a DLT prediction algorithm according to an implementation form. The apparatus 500 is used for coding DLT lookup tables using DLT prediction. In Block 501, DLT coding method of the current DLT is performed as in the prior art, i.e. according to [Kai Zhang, Jicheng An, Shawmin Lei, "3D-CE6.h related: An efficient coding method for DLT in 3DVC", Document of Joint Collaborative Team on 3D Video Coding Extension Development, JCT3V-00142, January, 2013]. The actual coding method utilized in this block 501 for coding the input signal can be adaptively selected depending on the context, e.g. if the input signal is delta-DLT 515 or reference DLT 513. In block 503, the DLT prediction is performed and the delta-DLT 515 is calculated as a difference between the current DLT 511 and the reference DLT 513. In block 505, a decision about using DLT prediction is made; if DLT prediction is used, delta-DLT 515 is coded in Block 501, otherwise current DLT 511 is coded in Block 501.

The reference depth lookup table 513 may correspond to the reference DLT 203 as described above with respect to FIG. 2a or to the reference DLT 213 as described above with respect to FIG. 2b. The current depth lookup table 511 may correspond to the current DLT 201 as described above with respect to FIG. 2a or to the current DLT 211 as described above with respect to FIG. 2b. The difference depth lookup table 515 may correspond to the difference DLT 205 as described above with respect to FIG. 2a or to the difference DLT 215 as described above with respect to FIG. 2b.

Figure 6:
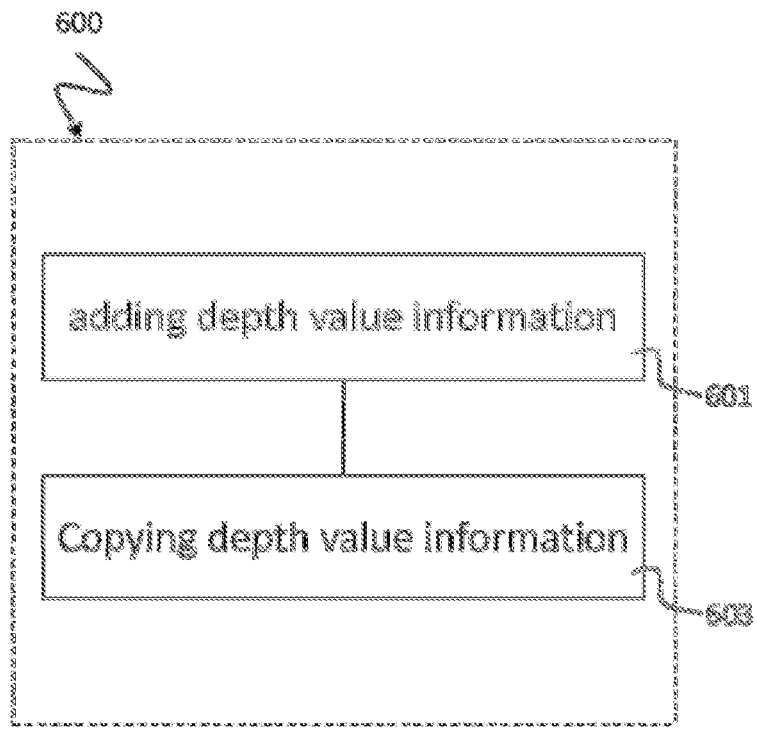
FIG. 6 shows a schematic block diagram of a method 700 for decoding a DLT according to an implementation form.

FIG. 6 shows a schematic block diagram of a method 600 for decoding a depth lookup table associated to at least a part of a 3D picture according to an implementation form. The method 600 comprises: adding 601 to the representation of the depth lookup table depth value information, which is present in a same kind of representation of a difference depth lookup table associated to at least the part of a 3D picture and which is not present in a representation of a reference depth lookup table. The method 600 comprises: copying to the depth lookup table depth value information of the representation of the reference DLT, which is not present in the representation of the difference depth lookup table.

In an implementation form, the representation of the difference depth lookup table corresponds to the difference lookup table and the representation of the reference lookup table corresponds to the reference lookup table, and wherein the depth value information corresponds to the depth values.

In an implementation form, the method 600 further comprises: decoding an encoded representation of the difference depth lookup table to obtain the difference depth lookup table; and decoding an encoded representation of the reference depth lookup table to obtain the reference lookup table.

In an implementation form, the representation of the difference depth lookup table corresponds to a difference list of indices representing depth values of the corresponding difference lookup table, the representation of the reference depth lookup table corresponds to a reference list of indices representing depth values of the corresponding reference lookup table, and wherein the depth value information corresponds to the indices.

In an implementation form, the representation of the difference depth lookup table corresponds to a difference binary string comprising a string of binary values, wherein a position of a binary value is associated to a depth value and a first binary value of a binary value indicates the occurrence of the depth value in the corresponding difference lookup table, the representation of the reference depth lookup table corresponds to a reference binary string comprising a string of binary values, wherein a position of a binary value is associated to a depth value and the first binary value of a binary value indicates the occurrence of the depth value in the corresponding reference lookup table, and wherein the depth value information corresponds to the binary strings.

In an implementation form, the representation of the difference depth lookup table corresponds to a range constrained bit map, RCBM, coded difference binary string, and the representation of the reference depth lookup table corresponds to a range constrained bit map, RCBM, coded reference binary string.

In an implementation form, the method 600 further comprises: analyzing a flag for indicating an identity between the representation of the depth lookup table and the representation of the reference depth lookup table; in case the flag indicates an identity, using the representation of the reference depth lookup table as representation of the depth lookup table associated to at least the part of a 3D picture.

In an implementation form, the reference depth lookup table is selected among previously coded depth lookup tables for other 3D pictures associated to other views, for other 3D pictures associated to other views and/or time instances of a 3D video sequence comprising the 3D picture, or for other parts of the 3D picture, for a corresponding part of another 3D picture associated to other views and/or time instances, wherein a part of the 3D picture comprises a slice, a coding unit, a coding block, or a macro block of the 3D picture.

In an implementation form, the method 600 further comprises: analyzing a type indicator comprised in a coding unit coding level, a slice header coding level, a picture header coding level, a picture parameter set coding level, a SPS coding level or a SEI coding level, the type indicator indicating whether the representation of the depth lookup table is encoded; and decoding a depth lookup table associated to at least the part of the 3D picture according to any of the claims 1 to 21 in case the type indicator indicates that representation of the depth lookup table is encoded.

In an implementation form, the method 600 further comprises: analyzing a type indicator comprised in a coding unit coding level, a slice header coding level, a picture header coding level, a picture parameter set coding level, a SPS coding level or a SEI coding level, the type indicator indicating a type of encoding used for encoding the representation of the depth lookup table; decoding a reference depth lookup table according to the type indicator; and decoding the depth lookup table associated to at least the part of the 3D picture.

In an implementation form, in case of a single-view video sequence the representation of the reference depth lookup table corresponds to a depth lookup table associated to another time instance, in particular to a depth lookup table for one of intra-periods, pictures and slices of a 3D video sequence comprising the 3D picture.

In an implementation form, in case of a multi-view video sequence the representation of the reference depth lookup table corresponds to a depth lookup tables associated for other views and/or time instances of the multi-view video sequence, in particular to depth lookup tables for one of intra-periods, pictures and slices of a 3D video sequence comprising the 3D picture.

In an implementation form, the representation of the reference depth lookup table corresponds to a depth lookup table of a same coding level. In an implementation form, the representation of the reference depth lookup table corresponds to a depth lookup table of a higher coding level, in particular of a slice header coding level, a picture parameter set coding level, a SPS coding level or a SEI coding level.

Figure 7:
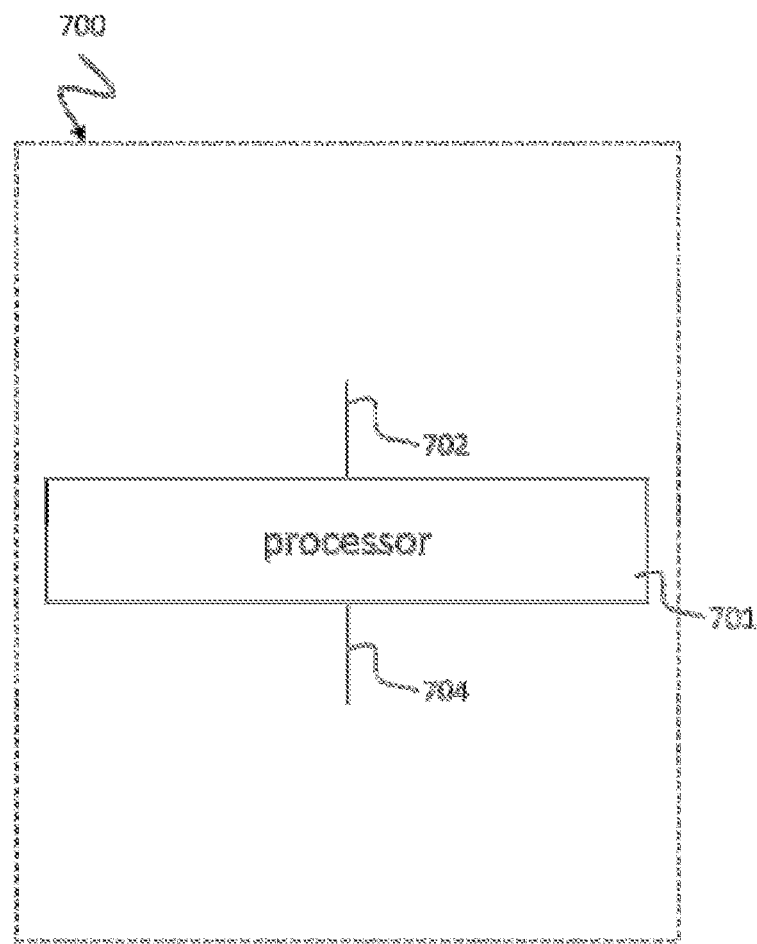
FIG. 7 shows a schematic block diagram of an apparatus for decoding a DLT according to an implementation form.
Figure 8:
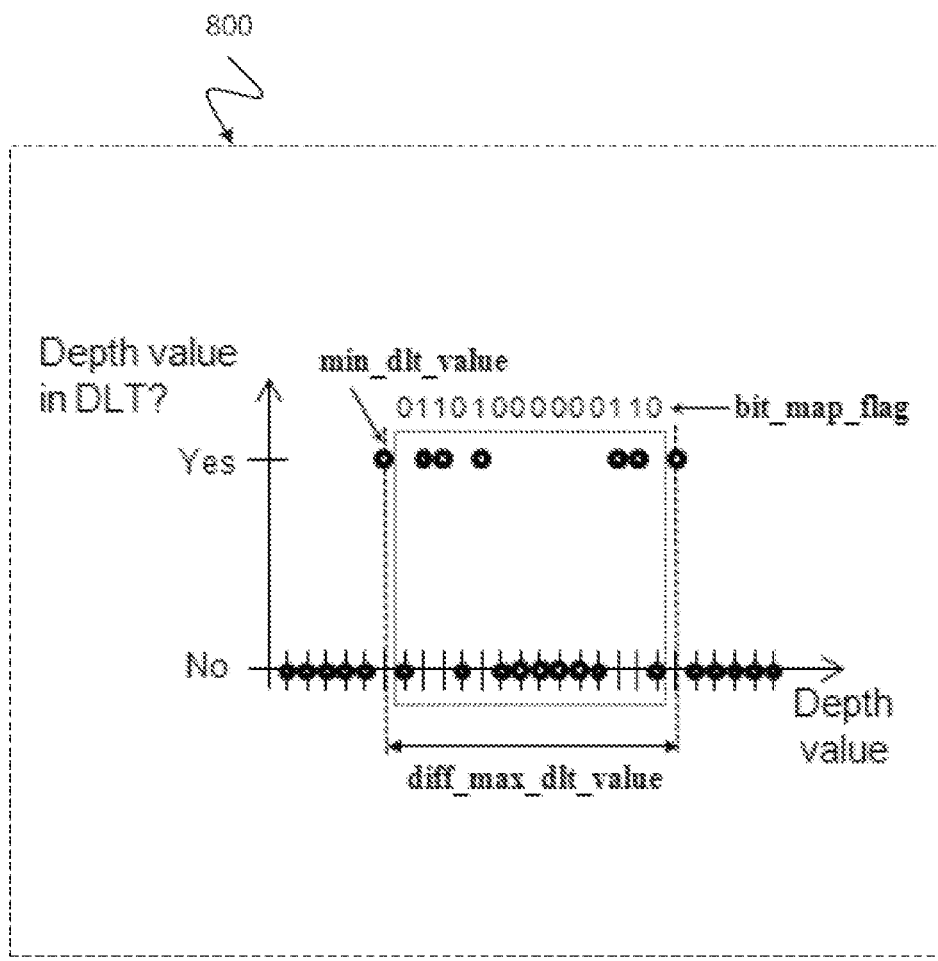
FIG. 8 shows a schematic diagram illustrating a depth lookup table (DLT) coding method 800 using conventional range constrained bit map (RCBM).

FIG. 7 shows a schematic block diagram of an apparatus 700 for decoding a DLT according to an implementation form. The apparatus 700 provides a depth lookup table 704 associated to at least a part of a 3D picture. The apparatus 700 comprises a processor 701 configured for adding to the representation of the depth lookup table depth value information, which is present in a same kind of representation of a difference depth lookup table associated to at least the part of a 3D picture and which is not present in a representation of a reference depth lookup table 702. The processor 701 is configured for copying to the depth lookup table 704 depth value information of the representation of the reference DLT 702, which is not present in the representation of the difference depth lookup table.

The reference depth lookup table 702 may correspond to the reference DLT 203 as described above with respect to FIG. 2a or to the reference DLT 213 as described above with respect to FIG. 2b. The (current) depth lookup table 704 may correspond to the current DLT 201 as described above with respect to FIG. 2a or to the current DLT 211 as described above with respect to FIG. 2b. The difference depth lookup table may correspond to the difference DLT 205 as described above with respect to FIG. 2a or to the difference DLT 215 as described above with respect to FIG. 2b.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the invention beyond those described herein. While the present inventions has been described with reference to one or more particular embodiments, those skilled in the art recognize that many changes may be made thereto without departing from the scope of the present invention. It is therefore to be understood that within the scope of the appended claims and their equivalents, the inventions may be practiced otherwise than as specifically described herein.

What is claimed is:

1. A method for coding a depth lookup table (DLT) that comprises depth value information of at least a part of a 3D video, the method comprising:

selecting a reference depth lookup table according to a prediction scenario and according to availability of one or more already encoded/decoded DLTs, wherein the prediction scenario is determined according to one or more indexes used to a predict the depth lookup table, wherein the one or more indexes comprise at least one of a view index or a time index of the 3D video, and wherein the one or more already encoded/decoded DLTs are DLTs that were encoded/decoded for at least one of other time instances or other views of the 3D video;

determining a difference depth lookup table according to a comparison between depth value information of a depth lookup table to be coded and depth value information of the reference depth lookup table by applying a logical operation to data representing the depth value information of the depth lookup table to be coded and the depth value information of the reference depth lookup table; and coding depth value information of the difference depth lookup table according to a predetermined coding rule, wherein the depth value information comprises at least one of depth values or indices representing depth values.

2. The method of claim 1, wherein the difference depth lookup table comprises depth value information occurring in the depth lookup table to be coded and not occurring in the reference depth lookup table and further comprises depth value information occurring in the reference depth lookup table and not occurring in the depth lookup table to be coded.

3. The method of claim 1, wherein an occurrence of depth values in the depth lookup table to be coded and an occurrence of depth values in the reference depth lookup table are represented as binary strings, wherein a first binary value of the binary strings indicates the occurrence of a depth value in a corresponding depth lookup table.

4. The method of claim 3, wherein the applying the logical operation to the data representing the depth value information of the depth lookup table to be coded and the depth value information of the reference depth lookup table comprises applying one of a logical XOR operation and a logical XNOR operation to the binary strings representing the depth value information of the depth lookup table to be coded and the depth value information of the reference depth lookup table.

5. The method of claim 1, further comprising coding depth value information of the reference depth lookup table using a first range constrained bit map coding of the reference depth lookup table;

wherein the coding the depth value information of the difference depth lookup table is performed using a second range constrained bit map coding of the difference depth lookup table.

6. The method of claim 1, comprising using a flag for indicating an identity between the depth lookup table to be coded and the reference depth lookup table.

7. The method of claim 1, further comprising:

protecting the difference depth lookup table against corruptions of the reference depth lookup table, by performing at least one of:

signaling a bit length of the depth values of the reference depth lookup table in a higher coding level; or sending a lost reference depth lookup table in a dedicated supplemental enhancement information (SEI) message.

8. The method of claim 1, wherein the coding the difference depth lookup table comprises a range constrained bit map coding according to 3D Video Coding Extension Development of ITU-T and ISO/IEC standardization.

9. A method for providing a representation of a depth lookup table associated with at least a part of a 3D video, the method comprising:
generating the representation of the depth lookup table, including depth value information which is present in a representation of a difference depth lookup table associated with at least the part of the 3D video and which is not present in a representation of a reference depth lookup table, and further including depth value information of the representation of the reference depth lookup table which is not present in the representation of the difference depth lookup table, by applying a logical operation to data representing the depth value information of the difference depth lookup table and depth value information of the representation of the reference depth lookup table;
wherein the reference depth lookup table is selected according to a prediction scenario from one or more already encoded/decoded depth lookup tables, wherein the prediction scenario is determined according to one or more indexes used to a predict the depth lookup table and further according to a sequence of the one or more indexes over which the depth table is predicted, wherein the one or more indexes comprise at least one of a view index or a time index of the 3D video, and wherein the one or more already encoded/decoded depth lookup tables are depth lookup tables that were encoded/decoded for at least one of other time instances or other views of the 3D video; and
wherein the depth value information comprises at least one of depth values or indices representing depth values.

10. The method according to claim 9, wherein the representation of the difference depth lookup table corresponds to the difference lookup table, wherein the representation of the reference depth lookup table corresponds to the reference depth lookup table, and wherein the depth value information corresponds to the depth values.

11. The method according to claim 10, wherein the method further comprises:
decoding an encoded representation of the difference depth lookup table to obtain the difference lookup table; and
decoding an encoded representation of the reference depth lookup table to obtain the reference depth lookup table.

12. The method according to claim 9, wherein the representation of the difference depth lookup table corresponds to a difference list of indices representing depth values of the corresponding difference lookup table, wherein the representation of the reference depth lookup table corresponds to a reference list of indices representing depth values of the corresponding reference depth lookup table, and wherein the depth value information corresponds to the indices.

13. The method according to claim 9, wherein the representation of the difference depth lookup table corresponds to a difference binary string comprising a string of binary values, wherein a position of a binary value is associated with a depth value and a first binary value of a binary value indicates an occurrence of the depth value in a corresponding difference lookup table, wherein the representation of the reference depth lookup table corresponds to a reference binary string comprising a string of binary values, wherein a position of a binary value is associated with a depth value and the first binary value of a binary value indicates an occurrence of the depth value in a corresponding reference depth lookup table, and wherein the depth value information corresponds to the difference binary string and reference binary string.

14. The method according to claim 9, wherein the representation of the difference depth lookup table corresponds to a range constrained bit map coded difference binary string, and the representation of the reference depth lookup table corresponds to a range constrained bit map coded reference binary string.

15. The method according to claim 9, the method further comprising:
analyzing a flag for indicating an identity between the representation of the depth lookup table and the representation of the reference depth lookup table; and
using, in response to the flag indicating an identity, the representation of the reference depth lookup table as representation of the depth lookup table associated to at least the part of the 3D video.

16. The method of claim 9, wherein the reference depth lookup table is associated with a depth lookup table for at least one of:
another 3D picture of the 3D video associated with a second view different from a first view associated with a 3D picture of the 3D video;
another 3D picture of the 3D video associated with a second view different from a first view associated with at least one of the 3D picture or a second time instance of a 3D video sequence comprising a 3D picture of the 3D video different from a first time instance of the 3D video sequence; or
another part of a second 3D picture of the 3D video different from a part of a first 3D picture of the 3D video and corresponding to a part of another 3D picture of the 3D video associated with a second view different from a first view associated with at least one of the first 3D picture or a second time instance of a 3D video sequence comprising the first 3D picture different from a first time instance of the 3D video sequence, wherein the part of the first 3D picture comprises a slice, a coding unit, a coding block, or a macro block of the first 3D picture.

17. The method of claim 9, the method further comprising:
analyzing a type indicator of at least one of a coding unit coding level, a slice header coding level, a picture header coding level, a picture parameter set coding level, a SPS coding level or a SEI coding level, the type indicator indicating whether the representation of the depth lookup table is difference encoded; and
decoding the depth lookup table associated with at least the part of the 3D video in response to the type indicator indicating that representation of the depth lookup table is difference encoded.

18. The method of claim 9, the method further comprising:
analyzing a type indicator of at least one of a coding unit coding level, a slice header coding level, a picture header coding level, a picture parameter set coding level, a SPS coding level or a SEI coding level, the type indicator indicating whether the representation of the depth lookup table is at least one of difference encoded or a type of difference encoding used for difference encoding the representation of the depth lookup table or indicating the representation of the reference to be used for difference decoding;
selecting a representation of a reference depth lookup table according to the type indicator; and decoding the depth lookup table associated with at least the part of the 3D video.

19. The method of claim 9, wherein, for a single-view video sequence, the representation of the reference depth lookup table is an already encoded/decoded DLT that corresponds to a depth lookup table associated with another a second time instance different from a first time instance associated with the 3D video and further associated with one of intra-periods, pictures and slices of a 3D video sequence of the 3D video.

20. The method of claim 9, wherein, for a multi-view video sequence, the representation of the reference depth lookup table is an already encoded/decoded DLT that corresponds to one or more depth lookup tables associated with one or more second views different from a first view associated with at least one of the 3D video or one or more second time instances different from a first time instance of a 3D video sequence of the 3D video and further corresponds to one or more depth lookup tables for one of intra-periods, pictures and slices of the 3D video sequence.

21. The method of claim 9, wherein the representation of the reference depth lookup table corresponds to one of a depth lookup table of a same coding level or a depth lookup table of a higher coding level that is at least one of a slice header coding level, a picture parameter set coding level, a SPS coding level or a SEI coding level.

22. An apparatus for providing a depth lookup table associated with at least a part of a 3D video, the apparatus comprising:

a processor; and
a non-transitory computer readable medium connected to the processor and having stored thereon instructions, that, when executed by the processor, cause the processor to:
  add, to a representation of the depth lookup table, depth value information that is present in a same kind of representation of a difference depth lookup table associated to at least the part of a 3D video and which is not present in a representation of a reference depth lookup table; and
  copy, to the depth lookup table, depth value information of the representation of the reference depth lookup table that is not present in the representation of the difference depth lookup table;
wherein the depth value information comprises at least one of depth values or indices representing depth values;
wherein the reference depth lookup table is selected according to a prediction scenario from one or more already encoded/decoded depth lookup tables, wherein the prediction scenario is determined according to one or more indexes used to a predict the depth lookup table and further according to a sequence of the one or more indexes over which the depth lookup table is predicted, wherein the one or more indexes comprise at least one of a view index or a time index of the 3D video; and
wherein, for a single-view video sequence, the representation of the reference depth lookup table corresponds to a depth lookup table associated with a second time instance different from a first time instance associated with the 3D video.

* * * * *